(12) United States Patent
Stoll et al.

(10) Patent No.: US 10,767,640 B2
(45) Date of Patent: Sep. 8, 2020

(54) METHOD FOR OPERATING AN OIL LEVEL REGULATOR

(71) Applicant: Kriwan Industrie-Elektronik GmbH, Forchtenberg (DE)

(72) Inventors: Franz Stoll, Pfedelbach (DE); Christoph Leja, Künzelsau (DE)

(73) Assignee: KRIWAN INDUSTRIE-ELEKTRONIK GMBH (DE)

( * ) Notice: Subject to any disclaimer, the term of this patent is extended or adjusted under 35 U.S.C. 154(b) by 310 days.

(21) Appl. No.: 15/685,321

(22) Filed: Aug. 24, 2017

(65) Prior Publication Data

US 2018/0058733 A1   Mar. 1, 2018

(30) Foreign Application Priority Data

Aug. 25, 2016   (DE) .................. 10 2016 115 778

(51) Int. Cl.
| | |
|---|---|
| *F04B 39/02* | (2006.01) |
| *F01M 11/12* | (2006.01) |
| *F16N 13/06* | (2006.01) |
| *F04C 29/02* | (2006.01) |
| *F04D 29/063* | (2006.01) |
| *F16N 19/00* | (2006.01) |

(52) U.S. Cl.
CPC ......... *F04B 39/0207* (2013.01); *F01M 11/12* (2013.01); *F04C 29/021* (2013.01); *F04D 29/063* (2013.01); *F16N 13/06* (2013.01); *F16N 19/006* (2013.01); *F04C 2270/24* (2013.01); *F16N 2250/18* (2013.01); *F16N 2270/10* (2013.01); *F16N 2270/74* (2013.01)

(58) Field of Classification Search
CPC ............ F16N 2270/10; F16N 2250/18; F16N 2260/04; F16N 2270/72; F16N 2270/74; F16N 2270/70; F16N 2250/16; F16N 2013/063; F04C 2210/1027; F04C 2270/24; F16M 13/06; F01M 2011/1486
See application file for complete search history.

(56) References Cited

U.S. PATENT DOCUMENTS

| | | | | |
|---|---|---|---|---|
| 4,750,337 | A | * | 6/1988 | Glamm ............... F04B 39/0207 62/468 |
| 5,094,598 | A | * | 3/1992 | Amata ............... F04B 39/0207 417/533 |

(Continued)

FOREIGN PATENT DOCUMENTS

| | | |
|---|---|---|
| DE | 3236012 C2 | 11/1987 |
| DE | 3213824 C2 | 4/1992 |

(Continued)

*Primary Examiner* — Nathan C Zollinger
*Assistant Examiner* — Timothy P Solak
(74) *Attorney, Agent, or Firm* — Renner Kenner Greive Bobak Taylor & Weber

(57) ABSTRACT

In the method according to the invention for operating an oil level regulator on a compressor, the oil level regulator monitors an oil level in the compressor and causes oil to be refilled when an oil deficiency is recognized. The oil level regulator provides operating recognition of the compressor in which a check is made as to whether the compressor is in a switched-on or switched-off state, the refilling with oil being carried out only when the compressor is in the switched-on state.

23 Claims, 4 Drawing Sheets

(56) References Cited

U.S. PATENT DOCUMENTS

| | | | | |
|---|---|---|---|---|
| 5,159,910 | A | * | 11/1992 | Ninomiya ................ F01M 1/12 |
| | | | | 123/196 AB |
| 5,634,345 | A | * | 6/1997 | Alsenz ................ F04B 39/0207 |
| | | | | 184/7.4 |
| 6,116,046 | A | | 9/2000 | Leaver et al. |
| 6,125,642 | A | * | 10/2000 | Seener ................ F04C 18/0215 |
| | | | | 184/103.1 |
| 6,257,837 | B1 | | 7/2001 | Adams et al. |
| 2005/0279111 | A1 | * | 12/2005 | Moriwaki ........... F04B 39/0207 |
| | | | | 62/193 |
| 2007/0214827 | A1 | * | 9/2007 | Venkatasubramaniam .................. |
| | | | | C10M 171/008 |
| | | | | 62/468 |
| 2016/0187173 | A1 | | 6/2016 | Jang et al. |

FOREIGN PATENT DOCUMENTS

| | | |
|---|---|---|
| DE | 4327262 C1 | 10/1994 |
| DE | 19537631 A1 | 4/1997 |
| DE | 202004014254 U1 | 11/2004 |
| DE | 102011084146 A1 | 4/2013 |
| EP | 1498608 B1 | 6/2006 |
| GB | 1548529 A | 7/1979 |
| JP | 2011-214511 A | 10/2011 |

* cited by examiner

METHOD FOR OPERATING AN OIL LEVEL REGULATOR

TECHNICAL FIELD

The invention relates to a method for operating an oil level regulator on a compressor, the oil level regulator monitoring the oil level in the compressor and causing oil to be refilled when an oil deficiency is recognized.

BACKGROUND

For this purpose, the oil level regulator has a suitable sensor that measures the oil level in the machine. When an oil deficiency is determined, a controller opens a solenoid valve in order to supply the machine with oil from a reservoir. In the INT 280 B® oil level regulator of the present applicant, during refilling of oil a filling period, comprising a filling cycle in which oil is refilled during a filling cycle period, and a pause cycle in which the refilling of oil is interrupted during a pause cycle period, is repeated until a sufficient oil level is reached. In the INT 280 B® oil level regulator, the filling cycle period and the pause cycle period in the first filling period each last for 5 s. In the next filling period, the periods are 10 s each, then 20 s each, and lastly 30 s each. The most recently achieved filling period (30 s filling and 30 s pause) is maintained until a sufficient oil level is reached. In this known oil level regulator, the cycle periods are fixed.

The quantity of oil refilled during a given filling cycle period varies very greatly with the prevailing pressure with which the oil is refilled. For refrigeration system compressors, operations were carried out in the past at oil pressures in the range of 30 to 50 bar. With the increasing use of carbon dioxide as a refrigerant, the pressure ranges from compressor to compressor vary significantly more than formerly. Transcritical $CO_2$ compressor facilities may thus be operated at a pressure of up to 130 bar.

SUMMARY

The object of the invention, therefore, is to improve the filling algorithm.

This object is achieved according to the invention by the features of claim 1.

In the method according to the invention for operating an oil level regulator on a compressor, the oil level regulator monitors an oil level in the compressor and causes oil to be refilled when an oil deficiency is recognized, the oil level regulator providing operating recognition of the compressor in which a check is made as to whether the machine is in a switched-on or switched-off state, the refilling with oil being carried out only when the compressor is in the switched-on state. This prevents the compressor from being switched off by the oil level regulator, even though oil could actually be refilled.

In the case of a compressor, this could otherwise take place, for example, as follows: oil is refilled by the oil level regulator on the low-pressure side of the compressor. The pressure for refilling the oil is built up by the running compressor. The oil reservoir is connected to the high-pressure side of the compressor and is therefore under high pressure, which is used to refill oil into the low-pressure side of the compressor. When the compressor is not running and the high pressure at the compressor outlet collapses, oil can no longer be refilled. After a maximum allowed filling time, the oil level regulator still recognizes an excessively low oil level and switches off the compressor as a precautionary measure. As a result, however, the compressor also can no longer be started by the refrigeration controller of the associated refrigeration system, so that no pressure is built up, and the compressor is unnecessarily continuously blocked.

The compressor may in particular be a compressor of a refrigeration system, or an air compressor.

According to another optional embodiment, during refilling of oil a filling period, comprising a filling cycle in which oil is refilled during a filling cycle period, and a pause cycle in which the refilling of oil is interrupted during a pause cycle period, may be repeated until a sufficient oil level is reached, wherein an average refill period (based on preceding refill periods) within which the sufficient oil level is reached is determined, and the filling cycle period and the pause cycle period are fixed as a function of the average refill period.

Due to adapting the filling cycle period and the pause cycle period, the particular circumstances of the compressor to be monitored may be taken into account. Thus, the periods are selected to be correspondingly shorter when a high oil pressure is present during refilling and a correspondingly large quantity of oil is refilled within a given period. The oil level regulator may thus operate automatically at differing, also fluctuating, pressure ranges.

Thus, a predefined number of filling periods is pursued for the refilling of oil until reaching a sufficient oil level, the filling cycle period and the pause cycle period being fixed as a function of the predefined number of filling periods. Unnecessary overfilling of the compressor with oil and an excessively large number of filling periods may be avoided in this way.

The filling cycle period may be computed in particular according to the following formula:

Filling cycle period=(average refill period/predefined number of filling periods)*a, where a is a value in the range of 0.5 to 0.9.

The pause cycle period may be computed in particular according to the following formula:

Pause cycle period=(average refill period/predefined number of filling periods)*b, where b=1−a.

The average refill period may be computed as the average value of a predefined number of the most recent refill periods. Thus, for example, 10+/−5 of the most recent refill periods may be taken into account. Within the scope of the invention, a weighted average value may also be formed by weighting the most recent refill period more heavily than the next most recent, and so forth. Thus, for computing the average value, for example the 10 most recent refill periods could be used, the most recent refill period being multiplied by 10, the next most recent refill period being multiplied by 9, . . . and the oldest refill period being multiplied by 1, in order to then form the sum and divide it by 55 (=10+9+8+7+6+5+4+3+2+1). However, any other number of refill periods taken into account, and also any other weighting of the individual refill periods, is also conceivable.

According to another embodiment of the invention, the refilling of the oil is continued for a predefined overfill period, even after reaching a sufficient oil level. The intent is thus to take into account the error signal of the sensor due to the foam formation effect. Ideally, the overfill period in which oil continues to be refilled is set in such a way that the correct oil level is reached after the foam subsides.

The overfill period is preferably settable, taking into account the specific conditions of the particular application. In particular the pressure of the oil during refilling and the type of foam formation may constitute factors to be taken into account.

According to one preferred embodiment of the invention, the filling algorithm contains the overfill period, the operating state of the compressor, and the adaptive adjustment of the filling cycle periods and pause cycle periods of a filling period.

Furthermore, it may be provided that the refilling of oil is interrupted when the compressor is brought from the switched-on state into the switched-off state during the refilling of oil.

The compressor may in particular have a low-pressure area and a high-pressure area, the oil being refilled by withdrawing the oil from a reservoir that is connected to the high-pressure side of the compressor and supplying it to the low-pressure area of the compressor.

According to another embodiment of the invention, it is provided that the oil level regulator monitors the refill period required for refilling oil, and switches off the compressor if a sufficient oil level is not reached within a predefined refill period.

BRIEF DESCRIPTION OF THE DRAWINGS

Further embodiments of the invention are explained in greater detail with reference to the following description and the drawings, which show the following.

DETAILED DESCRIPTION

Figure 1:
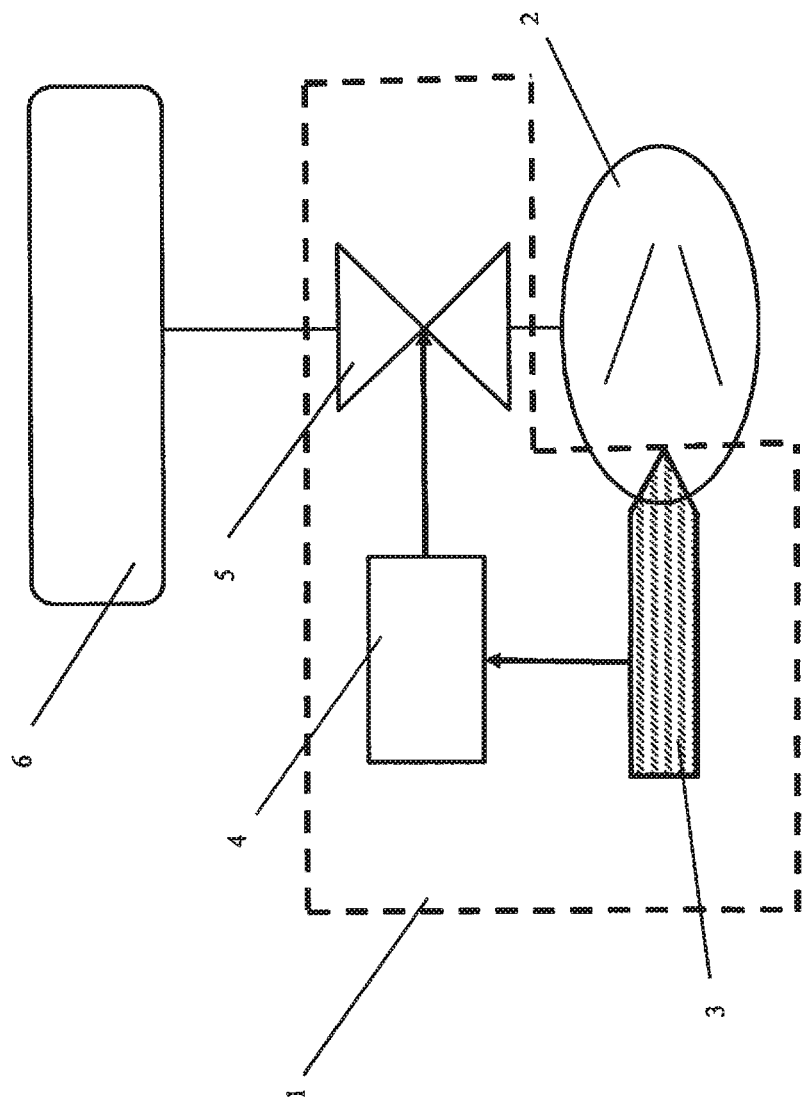
FIG. 1 shows a schematic illustration of a machine with an oil level regulator.

The compressor 2 illustrated in FIG. 1 has an oil level regulator 1 for monitoring the oil level. The task of the oil level regulator 1 is to refill the compressor 2 with oil from an oil reservoir 6 when there is an oil deficiency. For this purpose, the oil level regulator 1 has, for example, an optical sensor 3 that measures the oil level in the machine 2. When an oil deficiency is determined, a controller 4 opens a solenoid valve 5 in order to feed the compressor 2 with oil from the oil reservoir 6. In addition, the oil level is continuously monitored during the refilling, the solenoid valve being closed once again when a sufficient oil level is reached.

Figure 2:
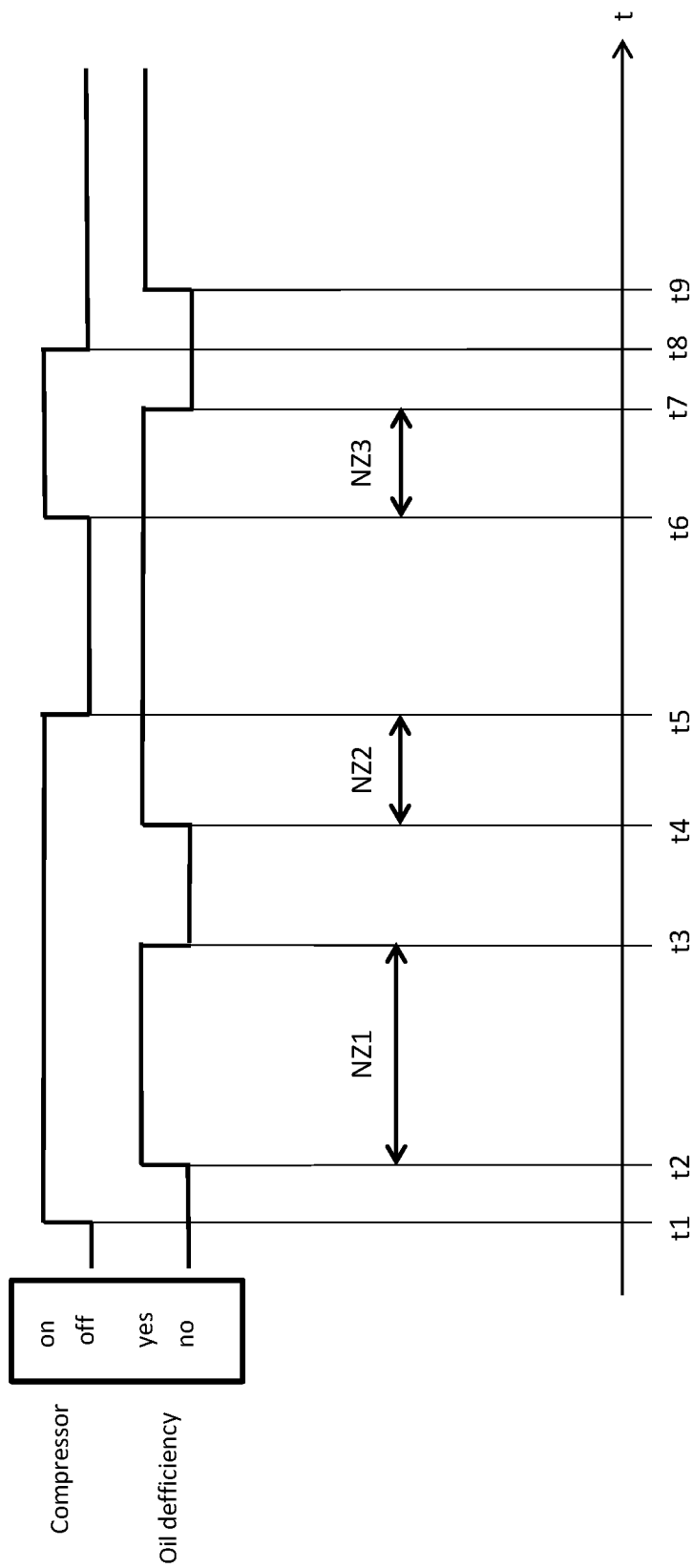
FIG. 2 shows a graphical illustration of the filling algorithm, taking the operating state of the machine into account.

FIG. 2 shows the filling algorithm according to the invention, in which a check is made as to whether the compressor 2 is in a switched-on or switched-off state, the refilling with oil being carried out only when the compressor is in the switched-on state.

In the illustrated example, the compressor 2 is switched on from time t1 to time t5 and between times t6 and t8, and otherwise is switched off. There is an oil deficiency between times t2 and t3, so that refilling of oil is carried out here by opening the solenoid valve 5 during a refill period NZ1. The next oil deficiency is determined at time t4, so that once again refilling of oil is brought about. The compressor 2 is switched off at a time t5, whereupon the refilling of the oil is immediately terminated (NZ2), although a sufficient oil level is not yet present. The refilling is not continued until the machine is switched on once again at time t6. The refill period NZ3 ends at time t7, at which a sufficient oil level is once again present. An oil deficiency is determined once again at time t9, but no refilling of oil is triggered since the compressor 2 is not switched on at this point in time. The refilling is not carried out again until the compressor 2 is once again switched on (no longer illustrated).

Figure 3:
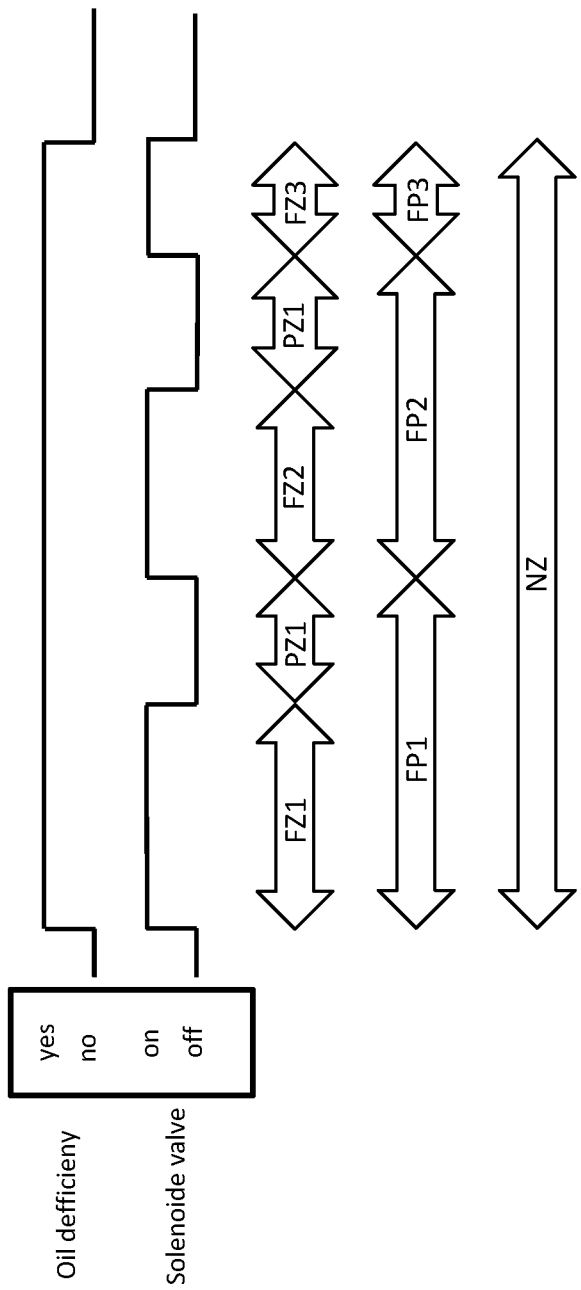
FIG. 3 shows a graphical illustration of the filling algorithm as a function of the oil level.

The filling algorithm during a refill period (NZ1, for example) is apparent from FIG. 3. The uppermost characteristic curve indicates whether the sensor diagnoses an oil deficiency ("yes"), or whether the sensor recognizes a sufficient oil level ("no"). Beneath this characteristic curve, the state of the solenoid valve 5 is indicated, oil being refilled in the open state ("open") and no oil being refilled in the closed state ("closed"). The refilling of oil takes place during multiple filling periods (FP1, FP2), each comprising a filling cycle in which oil is refilled during a filling cycle period FZ1 or FZ2, and a pause cycle in which the refilling of oil is interrupted during a pause cycle period PZ1. In the illustrated exemplary embodiment, there are two complete filling periods FP1 and FP2 as well as an initiated filling period FP3 that ends after a filling cycle period of FZ3, since beginning at this time, a sufficient oil level is once again present and the solenoid valve is closed. All three filling periods FP1, FP2, and FP3 form the refill period NZ.

For an adaptive filling algorithm, according to the invention the average refill period NZ, within which the sufficient oil level is reached, is determined. This takes place, for example, by taking the most recent 5 to 10 refill periods into account, wherein an average value is formed. The refill periods are advantageously taken into account in a weighted manner, in which the most recent refill periods are to be assigned a higher weighting than the less recent refill periods in order to take any changes in the operating conditions into account.

The filling cycle period may be computed according to the following formula, for example:

Filling cycle period=(average refill period/predefined number of filling periods)*$a$, where $a$ is a value in the range of 0.5 to 0.9.

The pause cycle period may then be analogously computed according to the following formula:

Pause cycle period=(average refill period/predefined number of filling periods)*$b$, where $b=1-a$.

The predefined number of filling periods may be in the range of 3 to 8, for example. The value $a$ is set at 0.8, for example, so that a value of 0.2 results for $b$. This means that the filling cycle period is four times longer than the pause cycle period. Here as well, however, some other ratio may be selected or set, depending on the circumstances.

In applications having very high pressure ranges, this correspondingly results in shorter filling periods and pause cycle periods, since the refilling takes place correspondingly faster.

According to another option, the oil level regulator monitors the refill period required for the refilling of oil, and switches the compressor off when a sufficient oil level is not reached within a predefined refill period. This control is used to protect the machine. Taking into account the operating state of the compressor, described above with reference to FIG. 2, is a meaningful supplement in particular for this additional monitoring, since the compressor 2 could otherwise be switched off by the oil level regulator 1, even though oil actually needed to be refilled.

Figure 4:
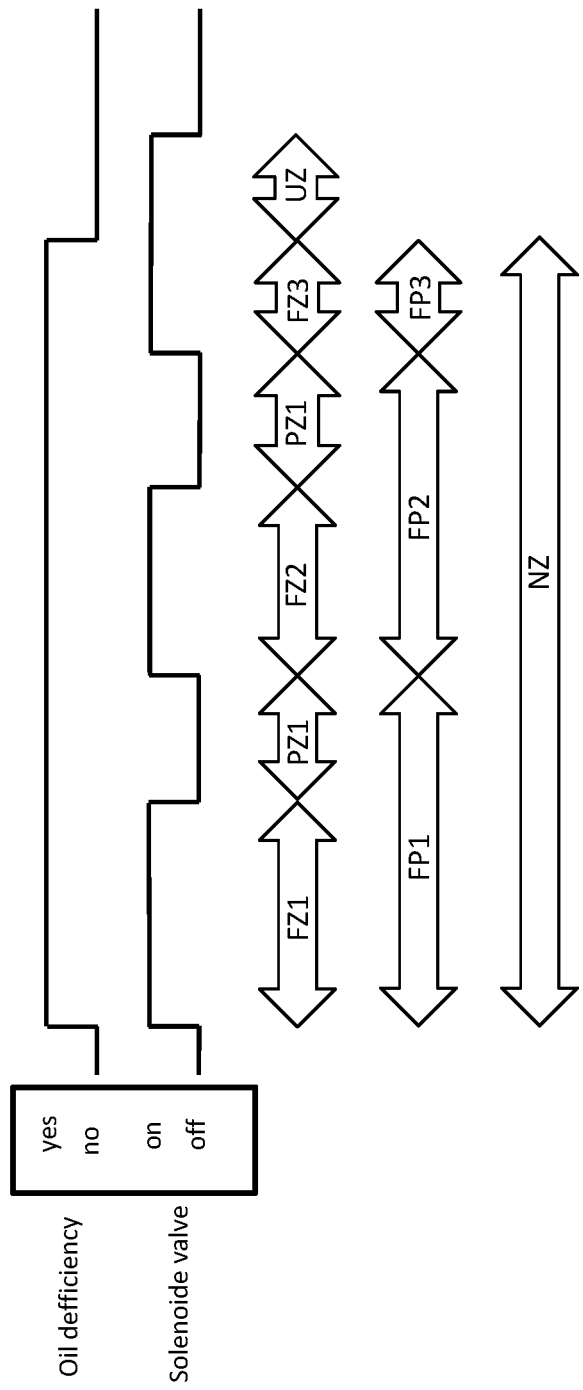
FIG. 4 shows a graphical illustration of the filling algorithm with addition of an overfill period.

FIG. 4 shows yet another option in which the refilling of the oil is continued for a predefined overfill period UZ when a sufficient oil level has already been determined. This takes account of the fact that, although the oil level regulator indicates a sufficient oil level, the measurement is based on the oil level regulator erroneously interpreting possible foam as oil, and thus reporting a sufficient oil level too early. By setting a suitable overfill period (5 seconds, for example), even more oil is refilled, so that the sufficient oil level is present after the foam subsides.

The invention claimed is:

1. A method for operating an oil level regulator on a compressor, the oil level regulator monitoring the oil level in the compressor and causing oil to be refilled when an oil deficiency is recognized,
    characterized in that the oil level regulator checks whether the compressor is in a switched-on or switched-off state, and refills the compressor with oil only when the compressor is in the switched-on state,
    further characterized in that, during refilling of oil, a filling period is repeated until a predetermined oil level is reached, the filling period comprising a filling cycle in which oil is refilled during a filling cycle period, and a pause cycle in which the refilling of oil is interrupted during a pause cycle period, and
    further characterized in that an average refill period within which the predetermined oil level is reached is determined, and the filling cycle period and the pause cycle period are fixed as a function of the average refill period.

2. The method according to claim 1, characterized in that the refilling the compressor with oil is interrupted when the compressor is brought from the switched-on state into the switched-off state during the refilling of oil.

3. The method according to claim 1, characterized in that the compressor is designed for generating a mass flow of a compressed gas.

4. The method according to claim 3, characterized in that the compressor has a low-pressure area and a high-pressure area, the oil being refilled by withdrawing the oil from a reservoir that is connected to the high-pressure area of the compressor and supplying it to the low-pressure area of the compressor.

5. The method according to claim 1, characterized in that the oil level regulator monitors the refill period required for refilling oil, and switches off the compressor if a predetermined oil level is not reached within a predefined refill period.

6. The method according to claim 1, characterized in that the average refill period is computed as the average value of a predefined number of the most recent refill periods.

7. The method according to claim 1, characterized in that the average refill period is computed as the weighted average value of a predefined number of the most recent refill periods.

8. The method according to claim 1, characterized in that the refilling of the oil is continued for a predefined overfill period, even after reaching a sufficient oil level.

9. The method according to claim 8, characterized in that the overfill period is settable.

10. The method according to claim 1, characterized in that the oil level regulator continuously monitors the oil level in the machine during the refilling.

11. The method according to claim 1, characterized in that the compressor is a compressor of a refrigeration system, or an air compressor.

12. A method for operating an oil level regulator on a compressor, the oil level regulator monitoring the oil level in the compressor and causing oil to be refilled when an oil deficiency is recognized,
    characterized in that the oil level regulator checks whether the compressor is in a switched-on or switched-off state, and refills the compressor with oil only when the compressor is in the switched-on state, further characterized in that, during refilling of oil, a filling period is repeated until a predetermined oil level is reached, the filling period comprising a filling cycle in which oil is refilled during a filling cycle period, and a pause cycle in which the refilling of oil is interrupted during a pause cycle period, and;
    characterized in that a predefined number of filling periods is pursued for the refilling of oil until reaching a sufficient oil level, and the filling cycle period and the pause cycle period are fixed as a function of the predefined number of filling periods, and
    further characterized in that the filling cycle period is computed according to the following formula:

$$\text{filling cycle period} = (\text{average refill period}/\text{predefined number of filling periods})*a,$$

where a is a value in the range of 0.5 to 0.9, and the pause cycle period is computed according to the following formula:

$$\text{pause cycle period} = (\text{average refill period}/\text{predefined number of filling periods})*b,$$

where $b = 1-a$.

13. The method according to claim 12, characterized in that the refilling the compressor with oil is interrupted when the compressor is brought from the switched-on state into the switched-off state during the refilling of oil.

14. The method according to claim 12, characterized in that the compressor is designed for generating a mass flow of a compressed gas.

15. The method according to claim 14, characterized in that the compressor has a low-pressure area and a high-pressure area, the oil being refilled by withdrawing the oil from a reservoir that is connected to the high-pressure area of the compressor and supplying it to the low-pressure area of the compressor.

16. The method according to claim 12, characterized in that the oil level regulator monitors the refill period required for refilling oil, and switches off the compressor if a predetermined oil level is not reached within a predefined refill period.

17. The method according to claim 12, characterized in that an average refill period within which the predetermined oil level is reached is determined, and the filling cycle period and the pause cycle period are fixed as a function of the average refill period.

18. The method according to claim 17, characterized in that the average refill period is computed as the average value of a predefined number of the most recent refill periods.

19. The method according to claim 17, characterized in that the average refill period is computed as the weighted average value of a predefined number of the most recent refill periods.

20. The method according to claim 12, characterized in that the refilling of the oil is continued for a predefined overfill period, even after reaching a sufficient oil level.

21. The method according to claim 20, characterized in that the overfill period is settable.

22. The method according to claim 12, characterized in that the oil level regulator continuously monitors the oil level in the machine during the refilling.

23. The method according to claim 12, characterized in that the compressor is a compressor of a refrigeration system, or an air compressor.

\* \* \* \* \*